(12) United States Patent
Ernstrom et al.

(10) Patent No.: US 6,885,740 B2
(45) Date of Patent: Apr. 26, 2005

(54) LOCAL EXCHANGE SUBSCRIBER LINE CONFERENCING METHOD

(75) Inventors: William Paul Ernstrom, Golden, CO (US); Thomas Edward Yackey, Broomfield, CO (US); Warren Edward Baxley, Westminster, CO (US); Jeffrey C. Adams, Lafayette, CO (US); Anna Lea Gellatly, Arvada, CO (US)

(73) Assignee: Polycom, Inc., Pleasanton, CA (US)

( * ) Notice: Subject to any disclaimer, the term of this patent is extended or adjusted under 35 U.S.C. 154(b) by 85 days.

(21) Appl. No.: 10/208,503

(22) Filed: Jul. 30, 2002

(65) Prior Publication Data

US 2003/0026407 A1 Feb. 6, 2003

Related U.S. Application Data (60) Provisional application No. 60/309,419, filed on Aug. 1, 2001.

(51) Int. Cl.[7] .............................................. H04M 7/00
(52) U.S. Cl. ............................. 379/207.02; 379/202.01
(58) Field of Search ........................ 379/207.02, 202.01, 379/207.01, 220, 201.01, 220.01, 283, 211.01, 211.02

(56) References Cited

U.S. PATENT DOCUMENTS

| | | | |
|---|---|---|---|
| 5,812,652 A | * | 9/1998 | Jodoin et al. .......... 379/205.01 |
| 5,974,133 A | | 10/1999 | Fleischer, III et al. |
| 5,995,608 A | | 11/1999 | Detampel, Jr. et al. |
| 6,178,237 B1 | | 1/2001 | Horn |
| 6,181,786 B1 | | 1/2001 | Detampel, Jr. et al. |
| 6,269,159 B1 | | 7/2001 | Cannon et al. |
| 6,304,652 B1 | | 10/2001 | Wallenius |
| 6,463,038 B1 | * | 10/2002 | Wilson ....................... 370/261 |
| 2002/0091769 A1 | | 7/2002 | Drozdzewicz et al. |
| 2002/0165963 A1 | | 11/2002 | Baxley et al. |

OTHER PUBLICATIONS

U.S. Appl. No. 09/426,684, filed Oct. 25, 1999, Baxley et al.
U.S. Appl. No. 10/238,121, filed Sep. 10, 2002, Adams et al.
The freedom to communicate, http://www.voyanttech.com/solutions/rv/how_it_works.php, circa 1999.

* cited by examiner

Primary Examiner—William J. Deane, Jr.
(74) Attorney, Agent, or Firm—Wong, Cabello, Lutsch, Rutherford & Brucculeri, LLP (57) ABSTRACT

A local conferencing exchange subscriber line conferencing method using a series of input signals from the phone of a subscriber, such as a dual-tone multifrequency (DTMF) sequence of key inputs starting with a star key input, to initiate the conference by enabling a termination attempt trigger. The conference is set up in a bridge and the phone of the subscriber is connected to the bridge. All subsequent callers to the subscriber's phone number at the local exchange carrier are routed and connected to the conference at the bridge. When the conference call ends, the subscriber's phone is returned to normal service.

19 Claims, 6 Drawing Sheets

LOCAL EXCHANGE SUBSCRIBER LINE CONFERENCING METHOD

RELATED INVENTIONS

This application claims priority to provisional application Ser. No. 60/309,419 filed Aug. 1, 2001 entitled LOCAL EXCHANGE SUBSCRIBER LINE CONFERENCING.

This application is related to Ser. No. 10/208,893 filed contemporaneously herewith entitled LOCAL EXCHANGE SUBSCRIBER LINE CONFERENCING and is herein incorporated by reference.

BACKGROUND OF THE INVENTION

1. Field of the Invention

The present invention pertains to call conferencing and, in particular, to reservation-less instant conferencing as it relates to business and residential local exchange telecommunication service subscribers.

2. Statement of the Problem

A need exists for Regional Bell Operating Companies (RBOCs), wireless carriers, and other Local Exchange Carriers (LECs) to provide simple conferencing services to residential and small office telephone service subscribers. Practicality of the conferencing service for local exchange subscriber line users is dependent upon extreme ease of use through simple, easy to remember access methods that utilize conferencing automation to the maximum practical extent.

U.S. Pat. No. 6,181,786 B1, owned by the assignee of the present invention, sets forth a method and apparatus for on-demand teleconferencing. This represents a prior call conferencing approach eliminating prior scheduling and operator interaction in setting up a conference call. This prior art approach uses, for example, the Signaling System No. 7 (SS7) out-of-band signaling to dynamically route incoming conference calls to bridges in a conferencing system having available resources. In operation, a subscriber to the conferencing service is given a telephone number for connecting to the conferencing system along with a system pass code and a maximum conference size at the time he or she signs up for the service. In order to have a conference, the subscriber distributes his or her access telephone number to the conference participants along with an access code and optional conference security (or PIN) code of the subscriber's choosing. The processing of the conference call, billing, etc. is handled at the conferencing system. This mechanism is considered overly complex for application to local exchange subscriber line users because of the need to remember these access telephone numbers, access codes, and PIN codes.

Current conferencing service available to local exchange subscriber line users includes three-way conferencing that is typically accessed through a hook-flash mechanism that provides the user with a second dial tone for use in connecting a third party to an existing two-party telephone call. A need exists to extend the capabilities of this type of service through significant simplification of access mechanism as well as through availability of greater than the three conventional call legs simultaneously involved in a conference call event.

SUMMARY OF INVENTION

The present invention solves the aforestated problem and meets the needs stated therein. The local exchange subscriber line conferencing of the present invention, from the perspective of the conferencing system, is characterized by reservation-less instant conferencing as it relates to business and residential telecommunication subscribers. From the perspective of the user, the service of the present invention is characterized by a simplified access method for conferencing services that takes advantage of telecommunication network capabilities to eliminate many of the current art complexities involved with accessing such service.

A local exchange subscriber line conferencing system and method is set forth herein. A series of input signals from the phone of a subscriber (such as a DTMF sequence of key inputs starting with a star key input) initiate the conference call in the LEC. The conference call is then set up in a bridge and the phone of the subscriber is connected to the bridge. All subsequent callers to the subscriber's phone number at the LEC are routed based on the enabling of a termination attempt trigger and connected to the conference call at the bridge. When the conference call ends, the subscriber's phone is returned to normal service so as to receive all incoming calls made to its phone number.

DETAILED DESCRIPTION OF THE INVENTION

1. Overview

The conferencing service of the present invention enables Regional Bell Operating Companies (RBOCs), Wireless Carriers, and other Local Exchange Carriers (LECs) to provide simple conferencing to residential and small office telephone service subscribers. The present invention, in one embodiment, uses the telephone "*" (star) key to initiate a conference call and like other star services, conferencing is activated by selecting the "*" key followed by a unique set of numbers. These are conventionally referred to as dual-tone multifrequency (DTMF) signals. Other access methods that do not use a "*" key code sequence for access represent additional embodiments of this present invention. Any predetermined series of key input signals from the phone of a subscriber can be used when the subscriber requests the conference call.

The subscriber informs the other parties (participants) to simply call the subscriber's phone number at the time of the conference. Subsequent parties to the conference call join either by dialing the published phone number of the subscriber or by dial-out from the conference. The LEC for the subscriber then routes all subsequent callers of the subscriber's phone number to the conference at a bridge where all such subsequent callers who are participants are connected to the conference.

At the end of the conference, the LEC returns the subscriber's phone to normal service so that any party then calling the subscriber's phone number is rung through to the subscriber's phone.

2. Operation a. System

Figure 1:
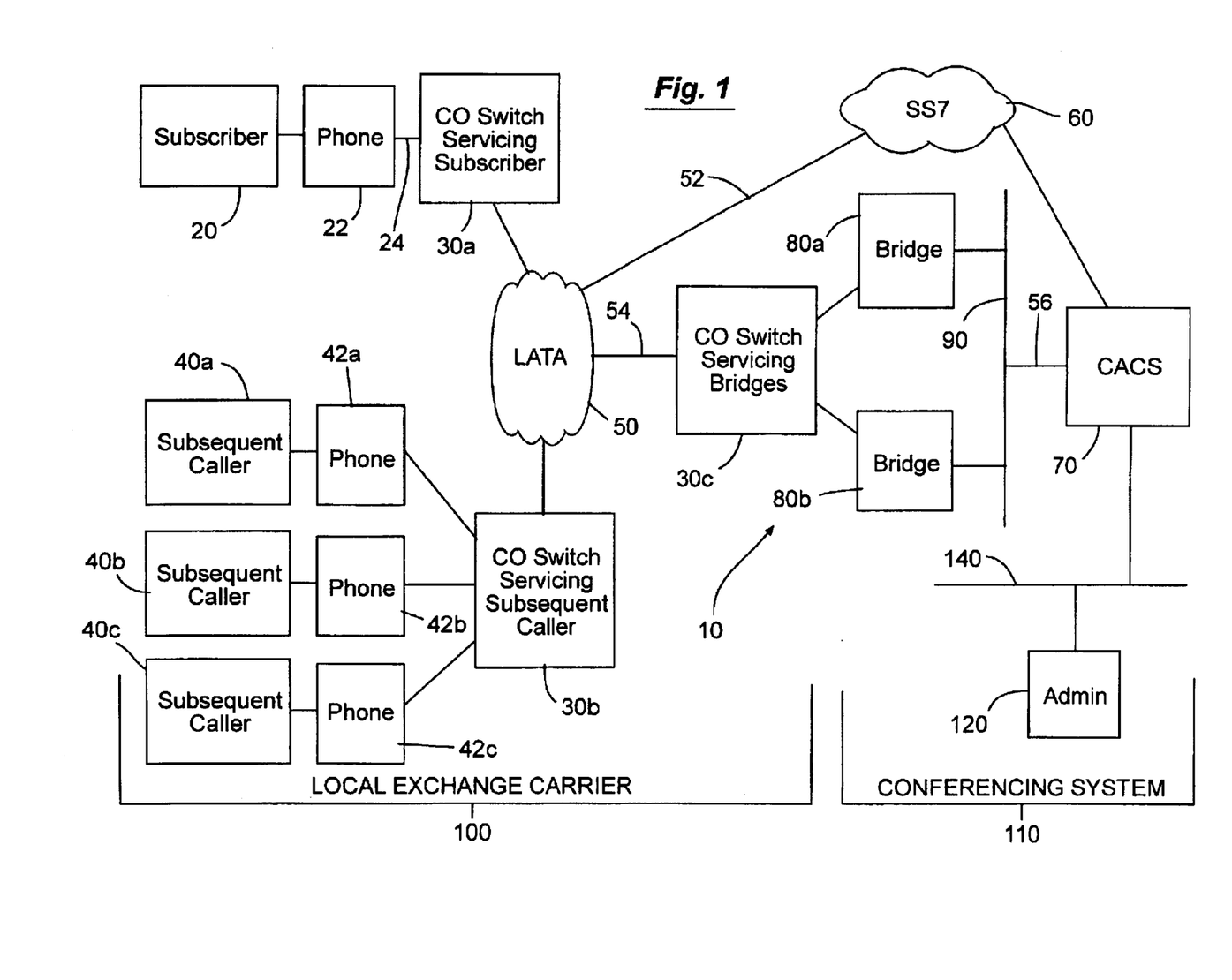
FIG. 1 sets forth one embodiment of the telecommunication network incorporating the conferencing service of the present invention.

In FIG. 1, the overview of the telecommunication network incorporating the conferencing service system 10 of the present invention is set forth. A subscriber 20 setting up the conference call is shown in communication with a central office (CO) or Mobile Switching Office (MSO) switch 30a. Likewise, subsequent callers 40a, 40b, 40c, and 40d to the conference call are shown at another CO or MSO switch 30b. In FIG. 1, the subsequent callers 40a–40d are illustrated having access to the same CO or MSO switch 30b. It is to be expressly understood that each subsequent caller 40 (such as 40a, 40b, 40c, 40d . . . ) could be accessing a different CO (or MSO) switch in the same LEC or in different parts of the country (or world) with different LECs, RBOCs, etc. It is also to be expressly understood that while the subscriber 20 is accessing the CO switch 30a through a calling phone set 22, that the present invention 10 is not limited to such an arrangement and the subscriber 20 could be accessing a mobile switching center through a wireless carrier by using a cell phone or the like.

The CO switches 30 (such as 30a, 30b, 30c, . . . ) are part of Local Access and Transport Areas 50 (LATAs) as defined based on the AT&T Bell System break up into 161 local telephone serving areas in the United States. LEC 100 has exclusive rights to operate within a LATA 50 subject to the state Public Utility Commission (PUC) regulations. In FIG. 1, LEC 100 and conference system 110 are in the LATA 50.

LATA 50 shown in FIG. 1 has two separate communication paths. The first path 52 is through the SS7 60 which communicates with a Conference Allocation and Control System (CACS) 70 in the conferencing system 110. An example of a commercially available CACS 70 is the READIVOICE system from Voyant Technologies, Inc. LATA 50 also communicates over path 54 with the switch 30c to further communicate with the conferencing bridges 80. The conferencing bridges 80 are connected to a Switched 10/100 Base T data network 90 which is also connected over path 56 to CACS 70. An example of a commercially available conferencing bridge 80 is the INNOVOX media server also from Voyant Technologies, Inc. The CACS 70 in turn is administered over a local area network 140 by an operator/administrator 120.

CACS 70 acts as the conferencing resource manager and contains information about subscribers and/or subscriber profiles and available bridge conferencing resources. In another embodiment the CACS 70 is within the LEC's network 100 and is installed behind a switch or multiple switches 30. As shown in FIG. 1, 'dynamic' routing, using the SS7 network 60, of a conference to a bridge 80 occurs and represents one embodiment. The present invention also uses alternative embodiments such as carrier-supplied signaling methods other than the SS7 network 60 (for example TCP/IP communication mechanisms that serve the same purpose), and signaling mechanisms where the communication is with the conferencing bridge 80 rather than the CACS 70 (for example Integrated Services Digital Network Primary Rate Interface (ISDN PRI). The conferencing methods set forth herein can be adapted to operate in a number of different telecommunication environments as discussed more completely in the related application filed contemporaneously herewith.

b. Subscriber

The subscriber 20 has the retail relationship with the LEC 100. The subscriber 20 receives local service from the LEC 100 and has selected to receive the conferencing service 10 of the present invention as an additional service such as conventional "call forwarding" from the LEC. The subscriber 20 interfaces, in one embodiment, with the application through a Plain Old Telephone Service (POTS) local loop phone 22. The conference is initiated by the subscriber 20 lifting the handset of the phone 22 and then entering for example '*' (i.e., pushing the "star" key) followed by a predetermined set of digits, for example "90." Any predetermined series of signals from the phone 22 such as a series of key inputs can be used. At that time, the subscriber 20 will be put into "conference mode." Conference mode means that the subscriber 20 is transferred into the conferencing system 110 and any subsequent calls to the subscriber's telephone number will be routed to the subscriber's conference on a bridge 80 assigned to the conference call where the subscriber's conference is located.

Optionally, prior to being routed to the conferencing bridge 80, participants 40 that call the subscriber's telephone number receive an Interactive Voice Response (IVR) message stating, for example: "The person that you have called is presently in a conference, please press 1 to join the conference or press any other number to be directed to default busy treatment." In one embodiment, if the subscriber presses any number other than "1", the caller will be forwarded to default call treatment, which may include voicemail (if the subscriber has a voicemail account with the LEC 100), call forwarding, or a busy signal.

It is to be expressly understood that in the aforesaid, local loop phone 22 can be any suitable phone device, such as a telephone, a cell or wireless phone, or any other suitable communication device used to provide subscriber line communications service. Furthermore, while the "star" key is the preferred key of use due to its conventionality in the telephone industry and understanding by the public, it is to be understood that any other suitable function key signal, voice command, code input, or other stimulation mechanism could be utilized under the teachings of the present invention. As another embodiment, a special key on a wireless telephone or icon on a wireless phone or wireless computing device is activated to generate the signal series. In a further embodiment, the signal series to place the subscriber line 24 in conference mode could be stimulated through interaction with an Internet web page or other user interface in communication with the CACS 70 via the Internet.

Routing of the calls to the conferencing bridge 80 is controlled by switch 30a and CACS 70. When the subscriber 20 enters the "star" key input followed by the predetermined set of digits to put his/her telephone number in conference mode in one embodiment of the invention, the switch 30a is set to direct the subscriber via a Dialed Number Trigger (DNT) to bridge 80. Subsequent callers 80a–d to the subscriber line 24 telephone number are, in one embodiment, forwarded via a Termination Attempt Trigger (TAT) to the same conference bridge 80.

C. Routing flow

Figure 2:
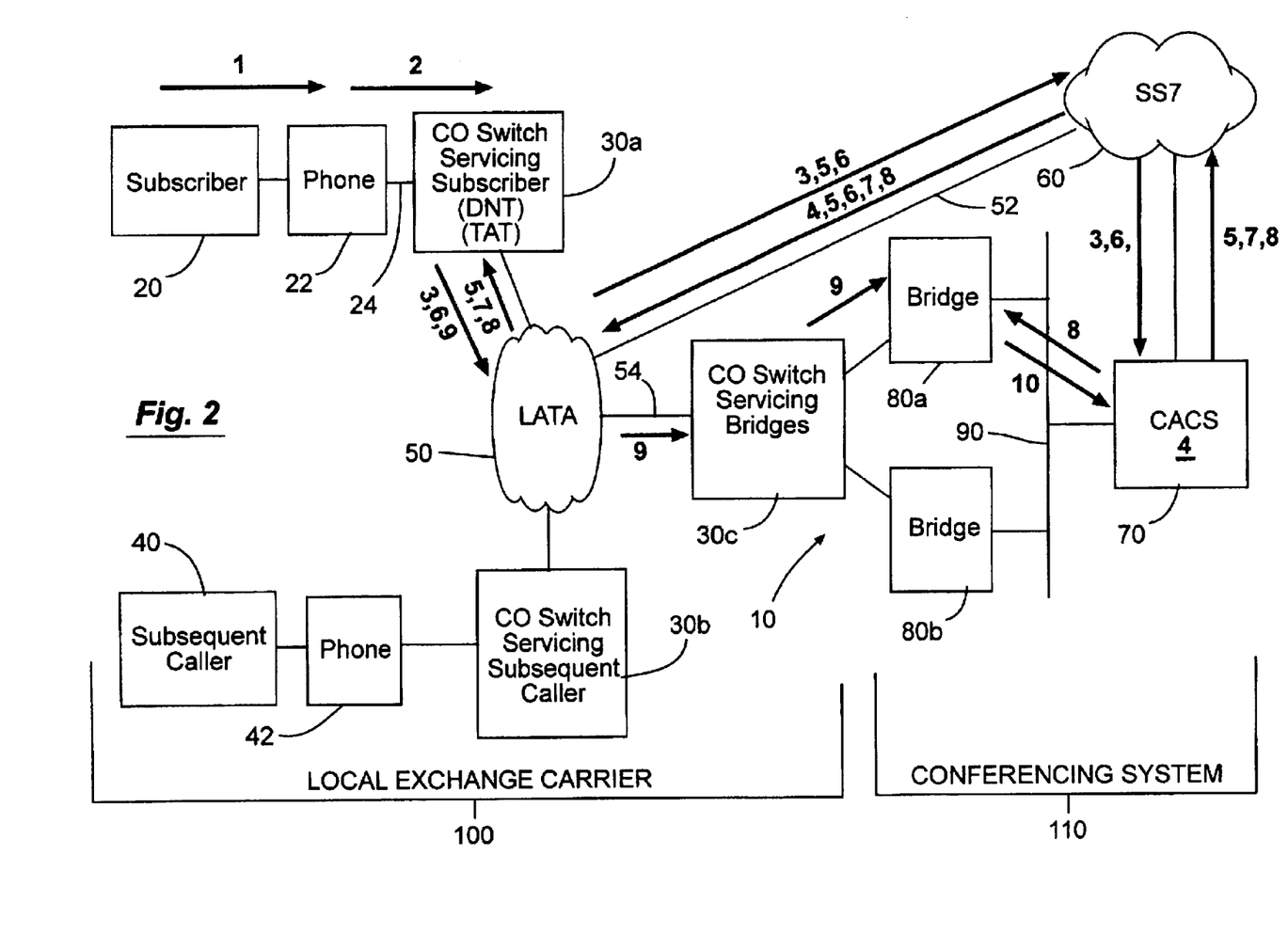
FIG. 2 is the network of FIG. 1 setting forth the method whereby a subscriber sets up a local exchange subscriber line conference call.

In FIG. 2, operation of the conferencing system 110 of the present invention for one embodiment in setting up a conference call is set forth.

(a) Subscriber *90 Dialing

The following "numbers" identify the sequence flow of one embodiment which is illustrated by the numbered arrows in FIG. 2. This is one method of the present invention by which a subscriber 20 initiates a conference call:

1. The subscriber 20 picks up the handset of the phone 22.
2. The subscriber 20 dials (for example) *90, which triggers a dialed number trigger (DNT) in the local switch 30a.
3. The CO switch 30a responds to the dialed number trigger (DNT) by sending a Transactional Capabilities Application Part (TCAP) query message to the CACS 70 via the SS7 Network 60 from LATA 50. The following information is contained in the TCAP message:
   i. Message Type=Conversation With Permission
   ii. Component Type=Invoke
   iii. Operation=Connectivity Control
   iv. Parameters=Called Number (i.e., number dialed by the subscriber, in this example, *90), Calling Number (i.e., subscriber 20 phone number)

This TCAP message communicates to the CACS 70 that subscriber 20 of the conferencing service 10 wishes to enable the line for conferencing. The subscriber's phone number is included in the "Calling Number" parameter. The number that the subscriber dialed ("*90" in this example) is contained in the "Called Number" parameter.
4. In one embodiment, the CACS 70 uses the Calling Number contained in the TCAP message to validate the subscriber and determine the profile of the conference (which may include enabled conferencing features and maximum conference size). In another embodiment, the CACS 70 uses the Calling Number to validate the subscriber and the Called Number to determine the conference profile. In yet another embodiment, the switch 30a may perform all subscription validation and the Called Number and/or Calling Number may be used by the CACS 70 to determine conference profile. The subscriber profile information is stored in memory in CACS 70. In all embodiments, based on the stored conference profile, the CACS 70 will conventionally determine which bridge 80 (if there are multiple bridges such as, for example, bridges 80a and 80b) shall host the conference based on resource availability.
5. Assuming that the caller 20 is a valid subscriber, the CACS 70 sends a TCAP message through the SS7 network 60 to the switch 30a in LATA 50 instructing it to toggle the subscriber's Termination Attempt Trigger (TAT) to "enabled". TAT is conventional, but the present invention is making a new use of it for conferencing under the steps of the present invention.
6. Switch 30a signals through the SS7 network 60 to the CACS 70 via TCAP queries to request call handling instructions for calls destined to the subscriber's phone 22. The following information is contained in this TCAP message:
   i. Message Type=Conversation With Permission
   ii. Component Type=Invoke
   iii. Operation=Update Request
   iv. Parameters=User ID or Number, Bearer Capability, Trigger Criteria Flag, where User Number is the subscriber line 24 phone number, Bearer Capability is "voice" and the Trigger Criteria Flag is "enabled".

The switch 30a also responds through the SS7 network 60 to the above TCAP query with another TCAP message to the CACS 70 that provides a successful acknowledgement. The following information is contained in this TCAP message:
   i. Message Type=Response
   ii. Component Type=Return Result
   iii. Operation=None
   iv. Parameters=None
7. The CACS 70 sends a TCAP message through the SS7 network 60 to the switch 30a including the network address of the selected bridge 80a that will host the conference. The following information is contained in this TCAP message:
   i. Message Type=Response
   ii. Component Type=Invoke
   iii. Operation=Call Forward
   iv. Parameters=Outpulse Number (Mandatory), Trunk Group Number (Optional), where the Outpulse Number identifies the incoming line with the conference running on the bridge 80, and the Trunk Group Number identifies the network address of the bridge 80 servicing the conference call.
8. The CACS 70 notifies the selected bridge 80a over the data network 90 that will be hosting the conference that a conference is about to commence, and instructs the selected bridge 80a to allocate the ports required to host the conference based on the conference profile of the subscriber 20. The order of steps 7 and 8 is immaterial.
9. Upon receipt of the TCAP message sent in step 7, the switch 30a routes the call of the subscriber 20 to the selected conferencing bridge 80a.
10. The selected bridge 80a notifies the CACS 70 that the conference is underway.

Following completion of all of the above steps, the call is completed to a conferencing system as described in U.S. Pat. No. 6,181,786 B1, or by other conventional means of conference control. In addition, the subscriber line 24 is now in "conference mode". Subsequent calls to the subscriber line 24 telephone number while in "conference mode" will be forwarded to the conferencing system as described in the following section.

The above method steps and message contents represent only an embodiment of the present invention and, it is to be understood, that method steps order and message contents can vary based upon individual telecommunication architects without departing from the spirit of the present invention.

(b) Subsequent caller routing

Figure 3:
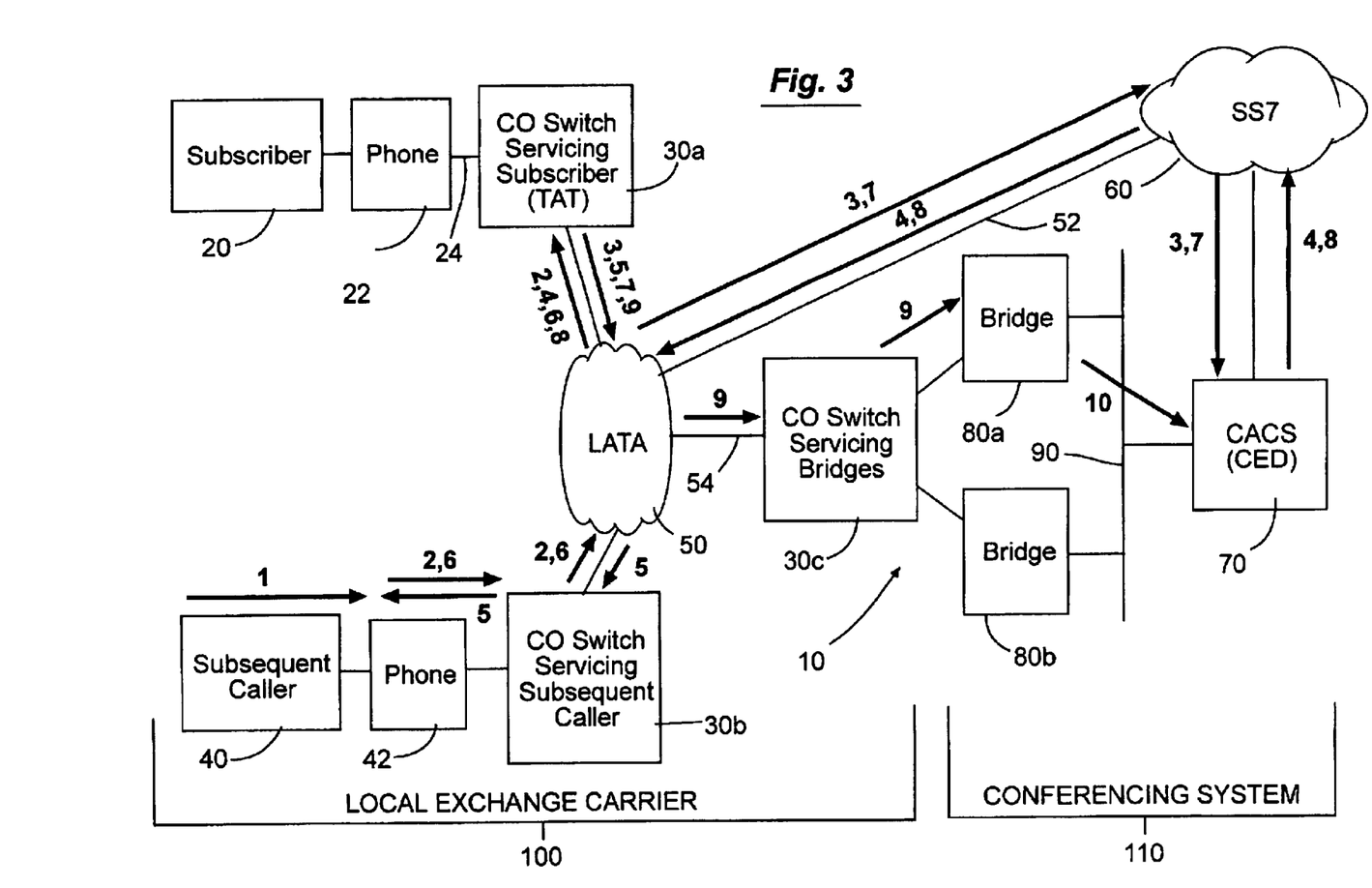
FIG. 3 is the network of FIG. 1 setting forth the method whereby a subsequent caller joins the subscriber's conference call.

In FIG. 3, operation of the conferencing method 10 of the present invention whereby a subsequent caller joins the conference call is set forth for the SS7 60 embodiment. The numbered arrows shown in FIG. 3 corresponds to the method of accomplishing this.

1. A subsequent caller 40 picks up the handset on phone 42 and dials the subscriber's phone number for phone 22.
2. Through conventional means, the subsequent caller's call is connected via the subsequent caller's local CO switch 30b and via the LATA 50 to the switch 30a that services the subscriber line 24. It is to be understood that the switch 30b can be the same as subscriber's switch 30a, located in the same LATA 50 as switch 30a, in a remote LATA location, or elsewhere.
3. The CO Switch 30a determines that the subscriber's Termination Attempt Trigger (TAT) is activated (via step 5 in the aforementioned subscriber flow), which causes a TCAP message to be sent to the CACS 70 via SS7 60 to determine where to forward the call. The following information is contained in the TCAP message:
  i. Message Type=Conversation With Permission
  ii. Component Type=Invoke
  iii. Operation=Connectivity Control Termination Attempt
  iv. Parameters=Called Number (number dialed by the subsequent caller, which would be the subscriber line 24 phone number), Calling Number (phone number of the subsequent caller 40)

4. Upon receipt of the TCAP message, the CACS 70 responds to the switch 30a with a TCAP message requesting that the switch 30a play an announcement to the calling party requesting the calling party (i.e., the subsequent caller 40) to input a code (i.e., called entered digits (CED)) having at least one DTMF input signal such as, for example, "press 1 to enter the conference" and to collect the digits entered by the calling party 40. The following information is contained in the TCAP message:
  i. Message Type=Conversation with Permission
  ii. Component Type=Invoke
  iii. Operation=Caller Interaction Send to Resource
  iv. Parameters=Play Announcement and Collect Digits Tag and Announcement Tag 5. The switch 30a plays a message to the subsequent caller 40 requesting that the caller "press '1' (or any other CED) to enter the conference or any other number to be directed to voicemail or other default busy treatment". Any other suitable message that conveys these instructions can be used here.

6. The subsequent caller 40 presses "1" (or any other CED) to join the conference, or any other digit to be disconnected or sent to default busy treatment (e.g. voicemail, busy signal) and this information is transmitted via conventional means back to switch 30a.

7. Upon collecting the digit or digits from the caller, the switch 30a responds to the TCAP message of the aforestated step 4 by sending a TCAP message through the SS7 network 60 to the CACS 70 containing the Caller Entered Digit(s) (CED) (which would be, for example, "1" in the instance that the calling party 40 wishes to join the conference and any other digit for alternative behavior). The following information is contained in the TCAP message:
  i. Message Type=Conversation with Permission
  ii. Component Type=Invoke
  iii. Operation=Caller Interaction Resource Clear
  iv. Parameters=Collected Digits (1 or other, or none)

8. The CACS 70, in one embodiment, validates the Caller Entered Digits (CED). The CACS 70 responds to the switch 30a with a TCAP message including call termination instructions. If the CED is "1", the instructions include information about on which bridge 80 to place this call (e.g., bridge 80a). The following information is contained in the TCAP message:
  i. Message Type=Response
  ii. Component Type=Invoke
  iii. Operation=Call Forward
  iv. Parameters=Routing Number of bridge or voicemail or other service (Mandatory), Trunk Group Number if routing number is for a bridge 80 (Optional)

If the CED is not "1", the message instructs the switch 30a to proceed normally (as if the subscriber's line were busy), which may include routing the caller to voicemail or other service. The following information is contained in the TCAP message:
  i. Message Type=Response
  ii. Component Type=Invoke
  iii. Operation=Connection Control Authorize Termination
  iv. Parameters=None 9. The switch 30a then routes the calling party 40 to the appropriate bridge 80 (e.g., 80a) or to alternative class service, or to busy line handling as determined from the caller 40 input in the aforestated step 8.

10. The bridge 80a sends a message over network 90 to the CACS 70 notifying it that the subsequent caller 40 is connecting to the conference.

The call is completed to a conferencing system 110 as described in U.S. Pat. No. 6,181,786 B1 or by other conventional means of conference control.

The above method steps and message contents represent only an embodiment of the present invention and, it is to be understood, that method steps order and message contents can vary based upon individual telecommunication architects without departing from the spirit of the present invention.

(c) End of Conference Call

Figure 4:
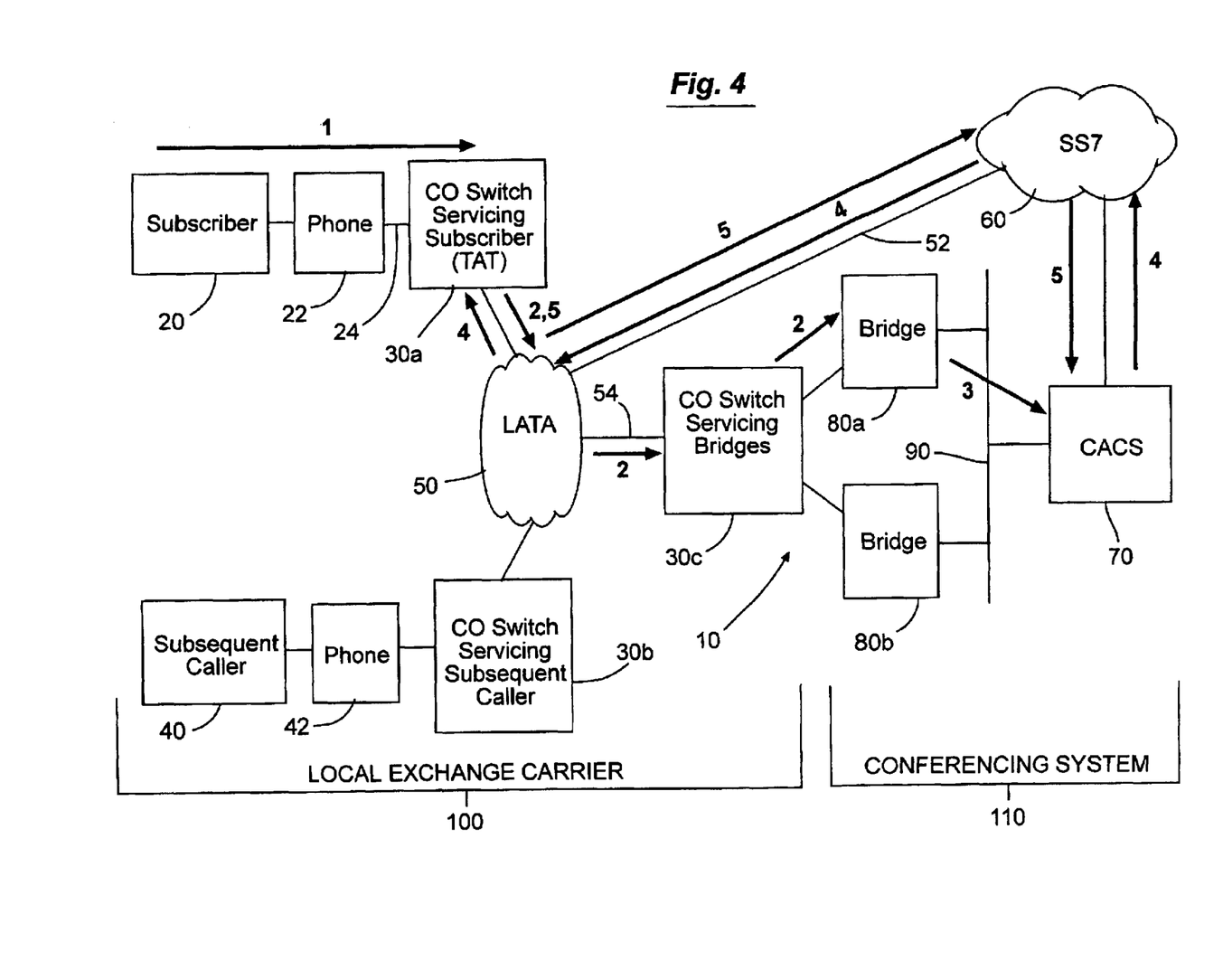
FIG. 4 is the network of FIG. 1 setting forth the method whereby the conference ends.

In FIG. 4, operation of the conferencing method 10 of the present invention whereby the conference ends and the subscriber line 24 is re-set to directly receive incoming telephone calls is set forth for the SS7 60 embodiment. The following numbered arrows shown in FIG. 4 correspond to the method of accomplishing this.

1. The conference call ends when the subscriber phone 22 is placed on hook and the subscriber line 24 conveys a disconnect signal to the switch 30a.

2. The CO Switch 30a detects conventionally that the subscriber line 24 has been disconnected and delivers a disconnect signal to the conferencing bridge 80a.

3. The bridge 80a informs the CACS 70 that the conference subscriber 20 has disconnected. In one embodiment, any remaining participants (e.g., subsequent callers 40) to the conference are disconnected at this point by sending a message indicating that participants should be disconnected from the CACS 70 to the bridge 80a. In an alternative embodiment, the remaining parties 40 are allowed to remain connected to the conference until they disconnect.

4. The CACS 70 sends a TCAP message through the SS7 network 60 to the switch 30a instructing it to toggle the subscriber's Termination Attempt Trigger (that was set in step 5 of the subscriber routing) to "disabled". This is the instruction that sets the subscriber line back to normal operating condition where calls to the subscriber line 24 phone number will ring the subscriber's phone 22, rather than forward to the conferencing service. The following information is contained in the TCAP message:
  i. Message Type=Conversation With Permission
  ii. Component Type=Invoke
  iii. Operation=Update Request
  iv. Parameters=User ID or Number, Bearer Capability (i.e. voice), Trigger Criteria, where User Number is the subscriber line 24 phone number, Bearer Capability is "voice" and Trigger Criteria Flag is "disable".

5. The switch 30a then responds to this TCAP message with another TCAP message through the SS7 network 60 to the CACS 70 indicating successful acknowledgement when the operation is complete. The following information is contained within this TCAP message:
  i. Message Type=Response
  ii. Component Type=Return Result
  iii. Operation=None
  iv. Parameters=None Upon completion of the last event, the subscriber line 24 is returned to normal operation, whereas subsequent calls to the subscriber line 24 phone number will not generate TCAP queries from the switch 30 to the CACS 70, thus preventing subsequent calls from being routed to the conferencing system 110.

The above method steps and message contents represent only an embodiment of the present invention and, it is to be understood, that method steps order and message contents can vary based upon individual telecommunication architects without departing from the spirit of the present invention.

(d) Pre-Route Locking and Unlocking

Figure 5:
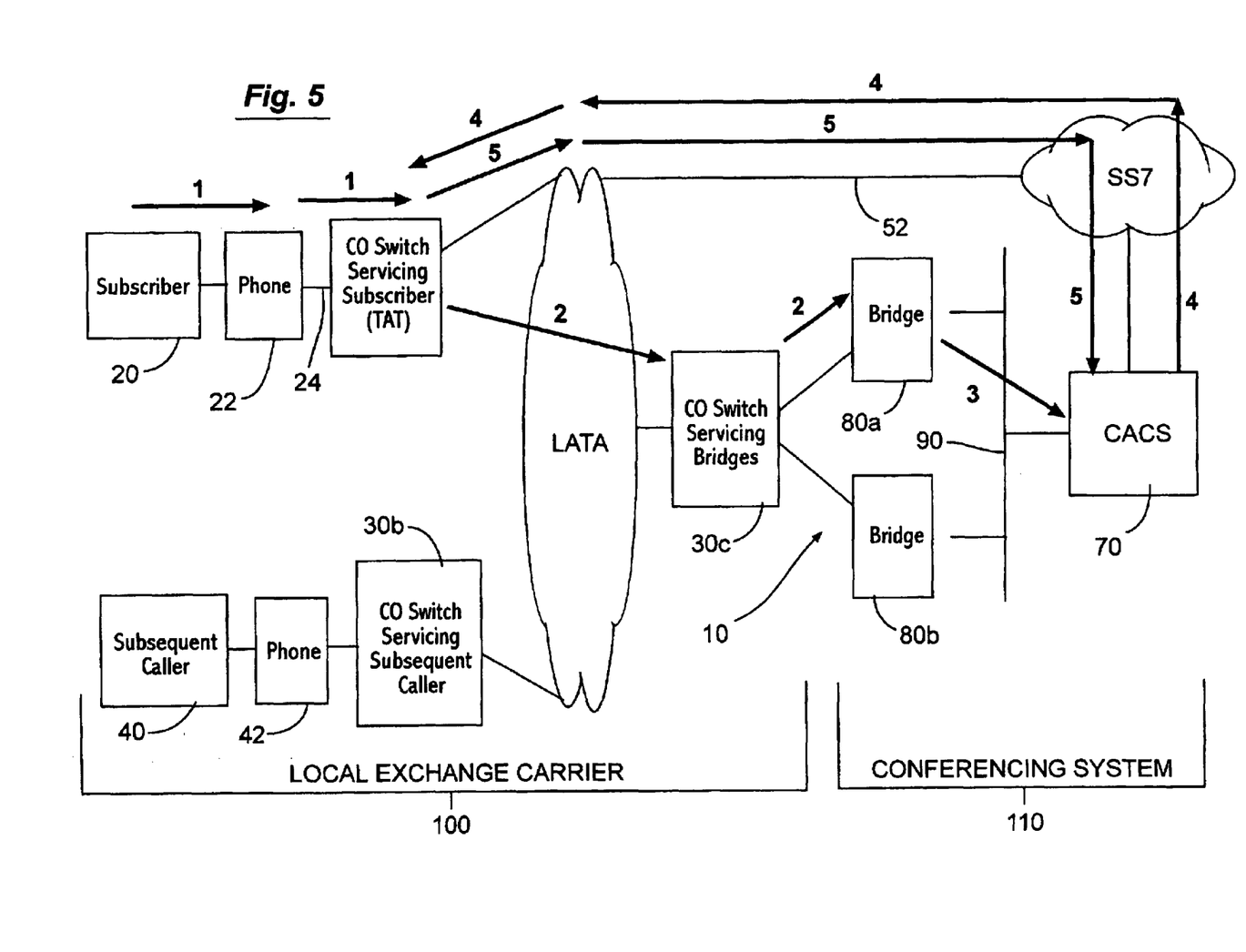
FIG. 5 is the network of FIG. 1 setting forth the method whereby a subscriber locks and unlocks the conference.

In FIG. 5, operation of the subscriber locking and unlocking the conference to prevent or allow subsequent callers from joining the conference call is set forth as one embodiment.

1. The subscriber 20 determines that the conference should be "locked" to prevent further subsequent callers 40 from being permitted to enter the conference. The mechanism by which the subscriber 20 controls the conferencing system 110 to indicate his/her desire to lock the conference is outside the scope of this present invention and is conventional such as a specific DTMF keystroke sequence received by switch 30a.
2. The command to lock the conference is delivered via conventional means to bridge 80a.
3. The bridge 80a notifies the CACS 70 that the conference should be locked, and no further subsequent callers should be permitted to enter the conference.
4. The CACS 70 sends a TCAP message through the SS7 network 60 to the switch 30a to set the Termination Attempt Trigger (TAT) to "disabled". This will set the subscriber's line 24 back to normal operating mode, where subsequent calls will no longer generate TCAP queries from the switch 30 to the CACS 70 to request call handling instructions. The following information is contained in the TCAP message:
  i. Message Type=Conversation With Permission
  ii. Component Type=Invoke
  iii. Operation=Update Request
  iv. Parameters=User ID or Number, Bearer Capability (i.e. voice), Trigger Criteria Flag, where User Number is the subscriber phone number, Bearer Capability is "voice" and Trigger Criteria Flag is "disable".
5. The switch 30a then responds to this TCAP message with another TCAP message indicating successful acknowledgement when the operation is complete. The following information is contained within this TCAP message:
  i. Message Type=Response
  ii. Component Type=Return Result
  iii. Operation=None
  iv. Parameters=None Upon completion of the last event, although the subscriber 20 is still in the conference, the subscriber line 24, from the perspective of switch 30, is returned to normal operation, whereas subsequent calls to the subscriber line 24 phone number will not generate TCAP queries to the conferencing system 110. Subsequent calls to the subscriber line will encounter the default busy treatment (busy signal, voicemail, or other service) for that subscriber.

Once locked, in order to unlock the conference, FIG. 5 depicts the same flow of activities with the following changes:

1. The subscriber 20 determines that the conference should be "unlocked" to allow further subsequent callers to be permitted to enter the conference. The mechanism by which the subscriber 20 controls the conferencing system 110 to indicate his/her desire to unlock the conference is also conventional and uses a DTMF key stroke sequence received by the switch 30a.
2. The command to unlock the conference is delivered to and received by via conventional means by the bridge 80a.
3. The bridge 80a notifies the CACS 70 that the conference should be unlocked, and further subsequent callers should be permitted entry to the conference.
4. The CACS 70 sends a TCAP message through the SS7 network 60 to the switch 30a instructing it to toggle the subscriber's Termination Attempt Trigger (TAT) to "enabled". As subsequent callers dial the subscriber's phone number, this TAT will cause the switch 30a to send a TCAP message through the SS7 network 60 to the CACS 70 to request call handling instructions when calls are placed to the subscriber's phone number. The following information is contained in this TCAP message to enable the Termination Attempt Trigger:
  i. Message Type=Conversation With Permission
  ii. Component Type=Invoke
  iii. Operation=Update Request
  iv. Parameters=User ID or Number, Bearer Capability, Trigger Criteria Flag, where User Number is the subscriber phone number, Bearer Capability is "voice" and the Trigger Criteria Flag is "enable".
5. The switch 30a responds to the above TCAP query with another TCAP message through the SS7 network 60 to the CACS 70 that provides a successful acknowledgement. The following information is contained in this TCAP message:
  i. Message Type=Response
  ii. Component Type=Return Result
  iii. Operation=None
  iv. Parameters=None Once completed, subsequent callers will be permitted to enter the conference as defined in section (b) (Subsequent Caller Routing).

The above method steps and message contents represent only an embodiment of the present invention and, it is to be understood, that method steps order and message contents can vary based upon individual telecommunication architects without departing from the spirit of the present invention.

In another embodiment, once the conference is locked, a message is played to any subsequent caller who calls the subscriber's phone number. This message informs the subsequent caller that the subscriber is in a closed conference and to leave a message by pressing a DTMF key (i.e., or press 7) or call back later. In another embodiment, the subsequent caller to the locked conference is given an announcement as above followed by a busy signal. It is to the understood that many variations can be provided under the teachings of the present invention.

4. Methods

Figure 6:
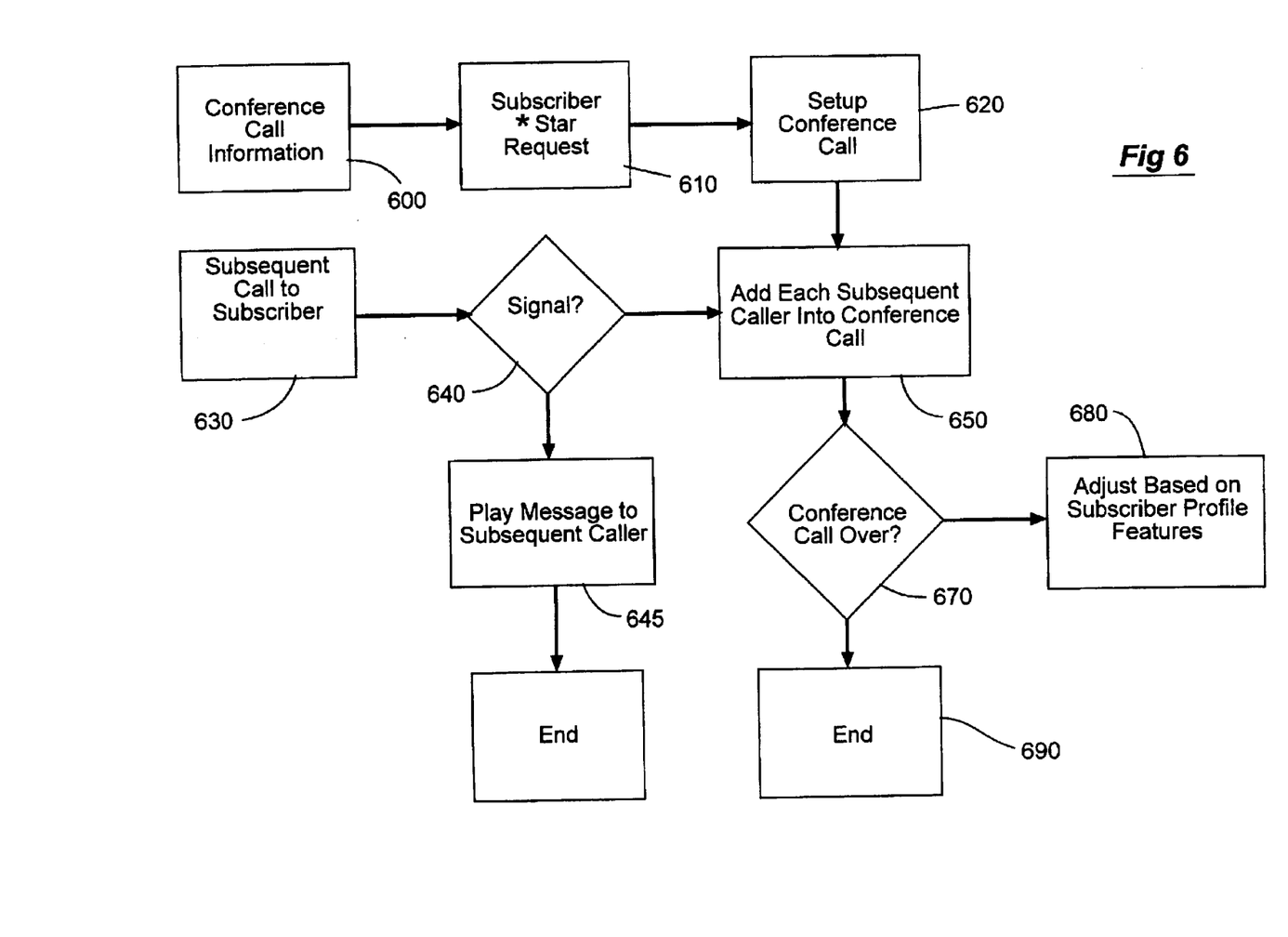
FIG. 6 is a flow chart illustrating the method of the present invention for a subscriber setting up a conference call and for subsequent callers to join the conference call.

In FIG. 6 and referencing FIG. 1, the setting up and participating in a conference call of the present invention is set forth. In step 600, the subscriber 20 contacts the other participants 40 in the conference call. For example, the subscriber 20 will call, e-mail, fax, etc. all other desired participants 40 in the conference call and inform them (1) of a time for the call and (2) to call his telephone number for his/her telephone 22 at that time. The performance of step 600 can be at any suitable time in advance of conference calls of the present invention.

In step 610, the subscriber 20 using phone 22 dials, in one embodiment, "*90" to initiate the conference.

In stage 620, the LEC 100 and the conferencing system 110, as fully described above, sets up the conference call for the subscriber 20. At this time, the subscriber 20 is on line and has a conference call set up ready for other participants based upon the subscriber's profile (step 410 in FIG. 6).

At or about the time of the conference call, the additional participants 40 in stage 630 calls the subscriber's telephone number for telephone 22. The LEC 100 in the conferencing system 100 forwards each subsequent caller 40 to the assigned bridge 80*a* in the conferencing system 110.

Optionally, in stage 640, the subsequent caller 40 enters the additional CED signal (or signals) such as pressing the number "1." When this signal is present, stage 650 is entered and the subsequent caller 40 is added as a participant to the conference call. If the signal "1" is not received, a message is played in stage 645 to the subsequent caller 40. In another embodiment, the subsequent caller 40 may be given one or more retries (not shown) and, if the subsequent caller does not enter the proper signal in stage 640, the process ends 660 with respect to that subsequent caller.

The conferencing system 110 monitors in step 670 whether the conference call is over and, if not, in stage 680 continues to monitor and adjust the conference call based upon the subscriber 20 profile features as keyed in by the subscriber 20 (in one embodiment) or as defined in the subscriber's profile that was provisioned at the time the subscriber subscribed to the LEC conferencing service (in another embodiment). Any operator, administrative, or profile features can be performed during the conference call.

Once the conference call is over, stage 690 is entered. The conference ends when the subscriber 20 disconnects. Any remaining participants 40 would be played a voice message and disconnected from the conferencing bridge. Upon disconnection, the switch immediately resets the subscriber line to "normal" mode allowing the subscriber to be able to receive normal point-to-point calls.

The above disclosure sets forth a number of embodiments of the present invention. Those skilled in this art will however appreciate that other arrangements or embodiments, not precisely set forth, could be practiced under the teachings of the present invention and that the scope of this invention should only be limited by the scope of the following claims.

We claim:

1. A conferencing method for a conference call in a telecommunications system comprising:

receiving, in a local central office switch, a series of input signals from a phone of a subscriber when the subscriber requests the conference call, the phone serviced by the local central office switch and the phone having a phone number, communicating between the local central office switch and a conferencing system that the subscriber is requesting the conference call in response to said receiving, enabling a termination attempt trigger in the local central office switch for the phone in response to said communicating, connecting the phone of the subscriber to a selected bridge in the conferencing system for the conference call in response to said communicating, receiving calls to the phone number in the local central office switch from subsequent callers after enabling the termination attempt trigger, routing each subsequent caller based on the enabled termination attempt trigger to the selected bridge, connecting each subsequent caller to the conference call in the selected bridge in response to said routing, returning the phone of the subscriber to normal service when the conference call ends by disabling the termination attempt trigger.

2. The conferencing method of claim 1 wherein the series of input signals is a DTMF sequence of key inputs starting with a "*" (star) key input.

3. The conferencing method of claim 1 further comprising:

triggering a dialed number trigger in the local central office switch for the phone in response to said receiving of the series of input signals, said communicating occurring in response to the triggering of the dialed number trigger.

4. The conferencing method of claim 1 wherein communicating between the local central office switch and the conferencing system occurs through Signaling System No. 7 of the telecommunications system.

5. The conferencing method of claim 1 wherein said communicating comprises sending to the conferencing system at least the phone number of the phone of the subscriber.

6. The method of claim 5 further comprising:

validating the sent phone number based on a conference profile for the subscriber stored in the conferencing system, setting up the conference call for the subscriber according to the conference profile in response to said validating.

7. The conferencing method of claim 1 wherein routing comprises:

playing an announcement to each subsequent caller when received at the local central office switch, the announcement requesting each subsequent caller to input at least one DTMF caller entered digit, inputting the at least one caller entered digit in response to said playing, validating the at least one caller entered digit in response to the aforesaid inputting, said connecting each subsequent caller to the conference call in the selected bridge occurring in response to said validating.

8. The conferencing method of claim 1 wherein returning comprises:

delivering a call disconnect signal received in the local central office switch from the phone of the subscriber to the selected bridge in the conferencing system, disconnecting the subscriber and all subsequent callers connected to the conference call in the selected bridge in response to said delivering, sending an instruction from the conferencing system to the local central office switch instructing that the termination attempt trigger be disabled in response to said delivering.

9. A conferencing method for a conference call in a telecommunications system, the telecommunications system at least having a switch, a conferencing system and Signaling System No. 7, the method comprising:

receiving, in the switch, a predetermined series of input signals from a phone of a subscriber when the subscriber requests the conference call, the phone serviced by the switch and the phone having a phone number, triggering a dialed number trigger in the switch for the phone in response to receiving the series of input signals, communicating transactional capabilities application part (TCAP) messages between the switch and the conferencing system via Signaling System No. 7 to provide the conference call in response to said triggering, enabling a termination attempt trigger in the switch for the phone in response to a TCAP message requesting enabling received by the switch during said communicating, connecting the phone of the subscriber to a selected bridge in the conferencing system for the conference call in response to a TCAP message received by the switch during said communicating, the aforesaid TCAP message containing an identity of the selected bridge, receiving calls in the switch to the phone number through the telecommunication system from subsequent callers after enabling the termination attempt trigger, routing each subsequent caller from the switch based on the enabled termination attempt trigger to the identified selected bridge, connecting each subsequent caller to the conference call in the selected bridge in response to said routing, returning the phone of the subscriber to normal service when the conference call ends by disabling the termination attempt trigger in response to a TCAP message received in the switch requesting disabling during said communicating.

10. The conferencing method of claim 9 further comprising:

receiving a lock command in the conferencing system from the phone of the subscriber signaling, during the conference call, that future subsequent callers are not to be connected to the conference call, sending a TCAP message from the conferencing system to the switch in response to receiving the lock command, disabling the termination attempt trigger in the switch in response to sending the aforesaid TCAP message so as to lock the conference call to future subsequent callers to the phone number of the subscriber, denying future subsequent callers connection to the conference call when the conference is locked.

11. The conferencing method of claim 10 further comprising:

receiving an unlock command from the phone of the subscriber signaling, when the conference call is locked, that the conference call is to be unlocked, sending a TCAP message from the conferencing system to the switch in response to receiving the unlock signals, re-enabling the termination attempt trigger in the switch in response to sending the aforesaid TCAP message so as to unlock the conference call to future subsequent callers, connecting the future subsequent callers to the conference call when the conference call is unlocked.

12. A conferencing method for a conference call in a telecommunications system comprising:

receiving a series of input signals from a phone of a subscriber whereby the subscriber requests the conference call, the phone serviced by a local central office switch and the phone having a phone number, connecting the phone of the subscriber to a selected bridge in the conferencing system for the conference call, receiving calls to the phone number in the local central office switch from subsequent callers, routing each subsequent caller to the conference call in the selected bridge, and returning the phone of the subscriber to normal service when the conference call ends.

13. The conferencing method of claim 12 wherein the series of input signals is a DTMF sequence of key inputs starting with a "*" (star) key input.

14. The conferencing method of claim 12 further comprising:

triggering a dialed number trigger in the local central office switch for the phone in response to the receiving of the series of input signals.

15. The conferencing method of claim 12 wherein communicating between the local central office switch and the conferencing system occurs through Signaling System No. 7 of the telecommunications system.

16. The conferencing method of claim 12 wherein connecting the phone of the subscriber to a selected bridge comprises sending to the conferencing system at least the phone number of the phone of the subscriber.

17. The method of claim 16 further comprising:

validating the sent phone number based on a conference profile for the subscriber stored in the conferencing system, setting up the conference call for the subscriber according to the conference profile in response to the validating.

18. The conferencing method of claim 12 wherein routing comprises:

playing an announcement to each subsequent caller when received at the local central office switch, the announcement requesting each subsequent caller to input at least one DTMF caller entered digit, inputting the at least one caller entered digit in response to the playing, validating the at least one caller entered digit.

19. The conferencing method of claim 12 wherein returning comprises:

delivering a call disconnect signal received in the local central office switch from the phone of the subscriber to the selected bridge in the conferencing system, thereby disconnecting the subscriber and all subsequent callers connected to the conference call in the selected bridge.

* * * * *